United States Patent [19]
Hinrichs

[11] 3,921,956
[45] Nov. 25, 1975

[54] SHAFT SEALING MEANS FOR BUTTERFLY VALVE

[75] Inventor: John Michael Hinrichs, Houston, Tex.

[73] Assignee: TRW Inc., Cleveland, Ohio

[22] Filed: Apr. 25, 1974

[21] Appl. No.: 464,119

[52] U.S. Cl. .............................................. 251/306
[51] Int. Cl.² ...................... F16K 1/226; F16K 1/32
[58] Field of Search ............ 251/306, 307, 308, 305

[56] References Cited
UNITED STATES PATENTS

| | | | |
|---|---|---|---|
| 3,346,005 | 10/1967 | Hanssen .......................... | 251/306 X |
| 3,420,498 | 1/1969 | Houseworth .................... | 251/306 X |
| 3,517,689 | 6/1970 | Roos ................................ | 251/306 X |
| 3,534,939 | 10/1970 | Frazier et al ...................... | 251/306 |
| 3,540,691 | 11/1970 | Snell, Jr. ........................... | 251/306 X |

Primary Examiner—Martin P. Schwadron
Assistant Examiner—Robert J. Miller
Attorney, Agent, or Firm—B. H. Mann; Frank B. Pugsley

[57] ABSTRACT

The portions of the valve liner in a butterfly valve, against which the end thrust surfaces around the valve disc shafting bear, are inclined relative to a plane normal to the axis of the shaft so as to produce varying compressive resistance force so that the sealing action of these liner portions is greatest when the valve disc is in closed position.

6 Claims, 7 Drawing Figures

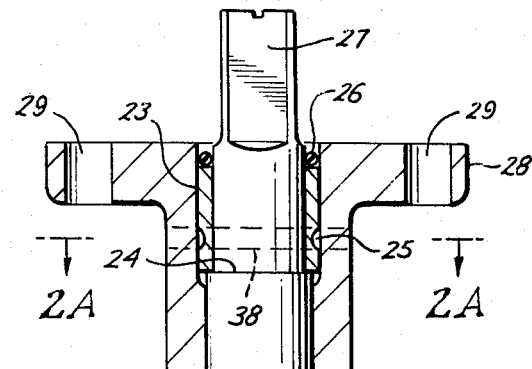
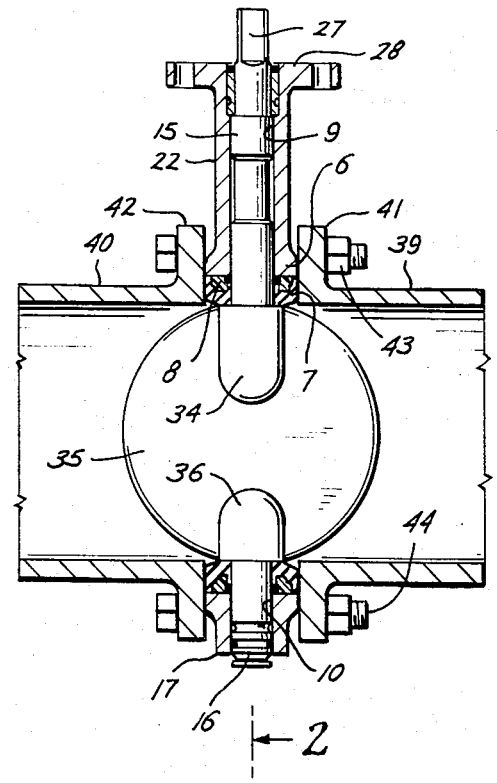
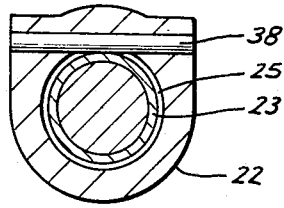
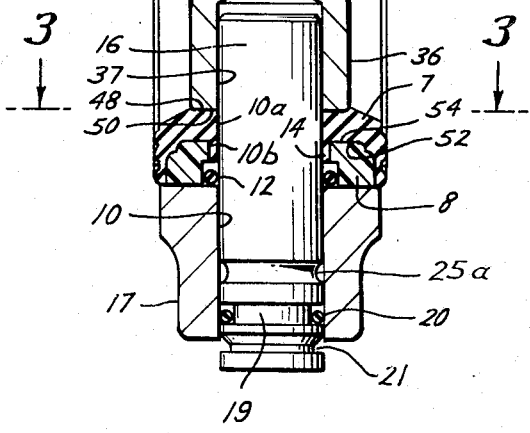

SHAFT SEALING MEANS FOR BUTTERFLY VALVE

BACKGROUND OF THE INVENTION

This invention relates to butterfly valves of the lined type and consists particularly in novel means for sealing the complementary bearing surfaces between the valve disc hubs and the linear structure surrounding the shaft openings in the liner.

An important disadvantage in such butterfly valves as heretofore constructed has been leakage which often occurs between the valve disc hub and the abutting body liner due to the corner there formed. Several methods have been tried to alleviate this problem, including parallel flats on the resilient liner structures and its reinforcing ring around the shaft openings, raised lands on the hub bearing surfaces causing increased compression of the liner bearing structures, and reduced seat thickness in the shaft hub area. None of the aforementioned methods has been completely successful, so that the addition of secondary seals around the shaft has been necessary to prevent external leakage.

Accordingly, an object of the present invention is to provide novel means for preventing or materially reducing leakage around the closed valve disc, particularly at the hubs.

A more detailed object is to provide a butterfly valve having a liner design incorporating improved sealing characteristics around the critical shaft hub-disc edge intersection or corner on the liner.

SUMMARY OF THE INVENTION

According to the present invention, the body liner is provided with diametrical, apertured structures forming the shaft journal bearings and having annular, flat inner end thrust bearing surfaces normal to the shaft axis and parallel to abutting end thrust bearing surfaces on the disc hubs. The opposite or outer surfaces of these body liner structures are inclined with respect to the aforementioned bearing surfaces in such a way that the portions of these apertured structures aligned with the edge of the disc in open position are thicker than the portions of the liner structures aligned with the edge of the disc in the closed position. In other words, the latter thinner portions are of greater compressive resistance, or stiffness, than the former portions so as to improve the sealing between the valve disc and liner when the valve is closed while reducing the resistance to turning as the valve is opened.

BRIEF DESCRIPTION OF THE DRAWINGS

In the accompanying drawings which illustrate the invention,

FIG. 1 is a vertical longitudinal section through a butterfly valve embodying the invention.

FIG. 2 is an enlarged section taken on line 2—2 of FIG. 1.

FIG. 2A is a detail section taken on line 2A—2A of FIG. 2.

DESCRIPTION OF THE PREFERRED EMBODIMENT

Figure 3:
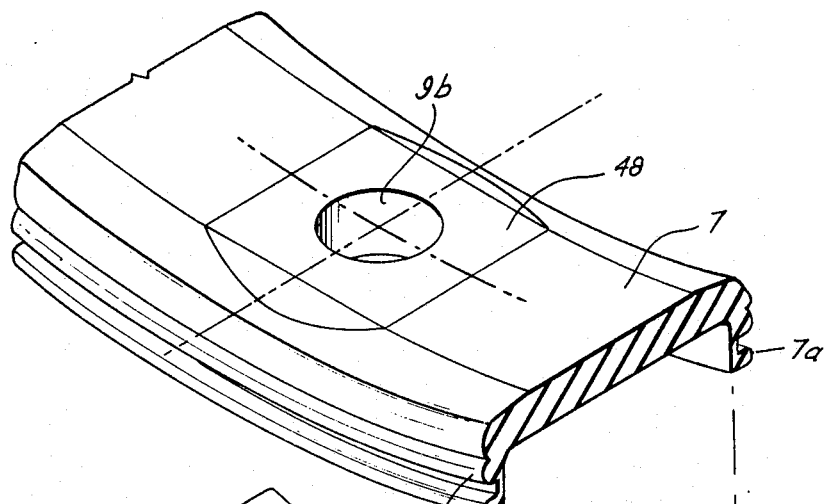
FIG. 3 is a still further enlarged, exploded view showing corresponding portions of the hub seat and backup ring portions of the liner.

The butterfly valve, shown the most completely in FIGS. 1 and 2, includes an annular body shell 6 within which is snugly although slidably received a liner assembly including internal part 7 of resilient material, such as rubber, and the backup ring 8 of harder material, for instance, phenolic resin. Diametrically aligned holes 9 and 10 are formed in the body shell, and registering holes 9a and 9b and 10a and 10b are formed, respectively, in rubber part 7 and backup ring 8. Holes 9b and 10b in the backup ring are inwardly countersunk to accommodate secondary sealing O-rings 11 and 12. Liner Part 7 has short apertured bosses 13 and 14 extending into diametral holes 9b and 10b in backing ring 8 and snugly encompassing stub shafts 15 and 16.

A relatively short neck 17 depends from the body shell in line with shaft openings 10, 10a, and 10b in the body and liner parts for journalling the end of stub shaft 16 provided with a sealing groove 19 accommodating a secondary O-ring seal 20, an end groove 21 for a prying tool to remove the shaft, and an annular groove 25a for a transverse holding pin, not shown, but as at 38 in FIG. 2A. At the upper end of the body there is provided a much longer hollow neck 22 journalling upper stub shaft 15 received at its upper portion in a bushing 23 resting at its lower extremity on the shoulder 24 on the stub shaft. The bushing has an annular external groove 25 and at its upper end abuts an O-ring 26. The upper end 27 of stub shaft 15 is noncircular in cross section for accommodating a handle or wrench. A flange 28 at the upper end of neck 22 has bolt holes 29 for attachment of an operator housing.

The lower end of upper stub shaft 15 is also of noncircular configuration, as at 32, and is received in a similarly shaped aperture 33 in hub-forming enlargement 34 on valve disc 35. A second hub-forming enlargement 36 at the lower edge of the disc has an axial aperture 37 receiving lower stub shaft 16. As shown in FIG. 1, the disc body is circular and hubs 34 and 36 thereon are diametrically arranged so that the valve disc may rotate a full 90° from the fully open position in FIG. 1, parallel to the axis of the valve body, to the fully closed position of FIG. 2 in which the circular edge of the valve disc sealingly abuts liner 7.

Upper stub shaft 15 is locked in position, with valve disc 35 accurately centered, by means of tangential pin 38 (FIG. 2A) traversing upper neck 22 and intercepting bushing groove 25. The lined body is designed to be secured between bolting flanges 41 and 42 on line pipes 39 and 40. It will be noted that liner 7 has outwardly extending flanges as 7a and 7b traversing the side edges of backing ring 8 and tightly gripped between backup ring 8 and line flanges 41 and 42 when installed in the piping.

Figure 4:
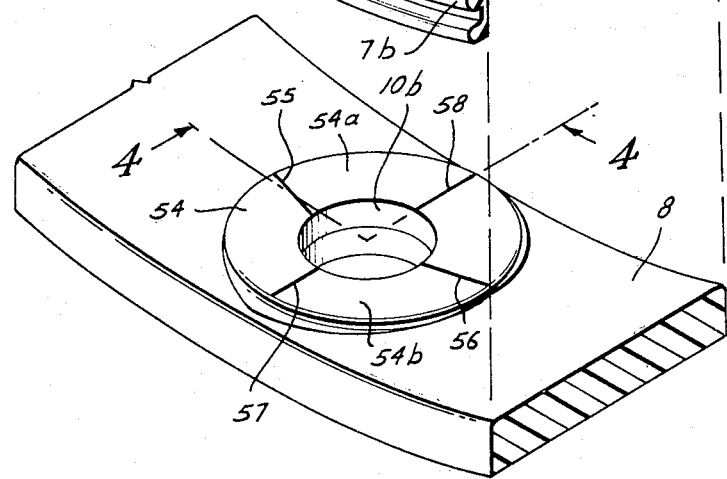
FIG. 4 is a still further enlarged, sectional split view taken on right-angle line 4—4 of FIG. 3. The left side of FIG. 4, shows the seal condition with the valve in closed position. The right side of FIG. 4, shows the seal condition with the valve in open position.

The inner surfaces of the liner apertured structures surrounding shaft openings 9a and 10a and 9b and 10b therein form annular, end-thrust bearing surfaces as 47 and 48 in FIGS. 3 and 4. The ends of disc hubs 34 and 36 form parallel end-thrust bearing surfaces 49 and 50. All of the bearing surfaces 47, 48, 49, and 50, preferably, are flat and are perpendicular to the shaft axis so that the mating pairs of these surfaces, engaging under substantial compressive sealing forces, may be subjected to relative rotation with minimal wear of the liner-bearing surfaces. However, the opposite outer surfaces 51 and 52 of these liner structures are not parallel to the corresponding inner bearing surfaces 47 and 48 thereof. Rather, these outer liner surfaces, and their mating surfaces 53 and 54 on the backing ring, are skewed or tilted so that portions of the shaft hole surrounding structures of the rubber liner, along a line paralleling the edge of valve disc 35, when wide open, will be thicker than the portions of said liner structures in quadrature therewith, i.e., aligned with the disc when closed. This is illustrated schematically in FIGS. 3 and 4. In FIG. 3, the diametral lines 55 and 56 on the annular surface 54 of the backup ring, are aligned with the edge of the valve disc in the fully closed position. Diametral lines 57 and 58 are aligned with the edge of the valve disc in wide open position. FIG. 4 (left-hand side) shows that the portions of abutting liner and backing ring surfaces 52 and 54 at line 55 are inclined in a radial plane with respect to surface 48 of the liner so that the outer peripheral liner portion 60 is thinner than the radially aligned inner peripheral portion thereof. As indicated on the right-hand side of FIG. 4, the portion 61 of the liner structure compressed between backup ring 8 and the valve disc hub is of uniform thickness radially. Thus, the surface quadrants 54a and 54b and the corresponding surface quadrants of liner surfaces 52 are skewed, preferably uniformly. Angle 62a at the ends of the skewed portions, as indicated in FIG. 4, is preferably on the order of from 4° to 6°.

Surfaces 52 and 54 may be uniformly tilted instead of skewed, a preferred arrangement from the point of view of ease of manufacture wherein small dihedral angles are formed at radial hub surface lines 58 and 57, corresponding to angle 62 in FIG. 4. In the skewed arrangement shown in FIG. 4, the inner portions of all quadrants (FIG. 3) are of uniform thickness, while the outer peripheries of quadrants 54a and 54b progressively increase in thickness, so that the corresponding portions of the rubber liner are progressively thinner. This causes application of maximum sealing force to the hub surfaces, with the disc closed, at corners 63 between the flat end-thrust bearing surface 48 and the continuing circular parts of the liner inner face.

Figure 5:
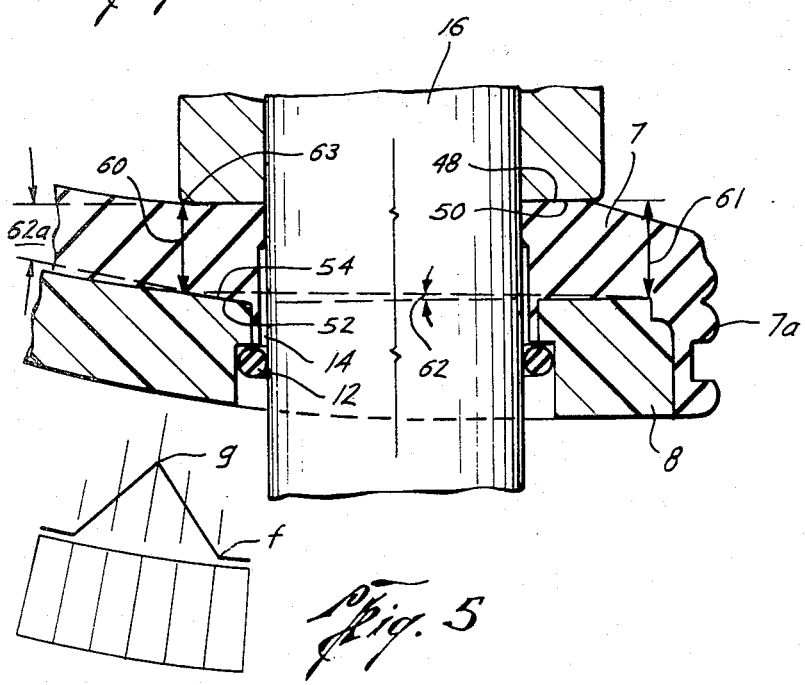
FIG. 5 is a graphical representation of the sealing forces applied between the abutting hub and liner surfaces.

The graph in FIG. 5 illustrates the increase in compressive sealing force mentioned. The point $f$ represents the nominal compressive or sealing force applied by the liner to hub surfaces 48 and 50 with the valve in wide-open position. The point $g$ represents the compressive or sealing force applied by the liner to the hub bearing surfaces at corners 63 when the valve is in closed position. In an exemplary embodiment, the compressive or sealing force applied to the hub surface in the closed position was approximately 12 percent greater than the corresponding sealing force applied with the disc wide open.

The mating surfaces 52 and 54 and 51 and 53 are identical, and the above detailed description of one pair of mating surfaces is regarded as applying to both pairs. Substantial advantages may be obtained if these mating surfaces are tilted in gradual inclined plane fashion, rather than being skewed, as shown in FIG. 4 at the left side. Certain aspects of the invention may be achieved by modifying configuration of the end thrust surfaces of the disc hub to provide increased sealing resistance between the abutting valve disc and liner structures. Moreover, the principle may be applied to other types of disc valves with sealing liners.

Figure 6:
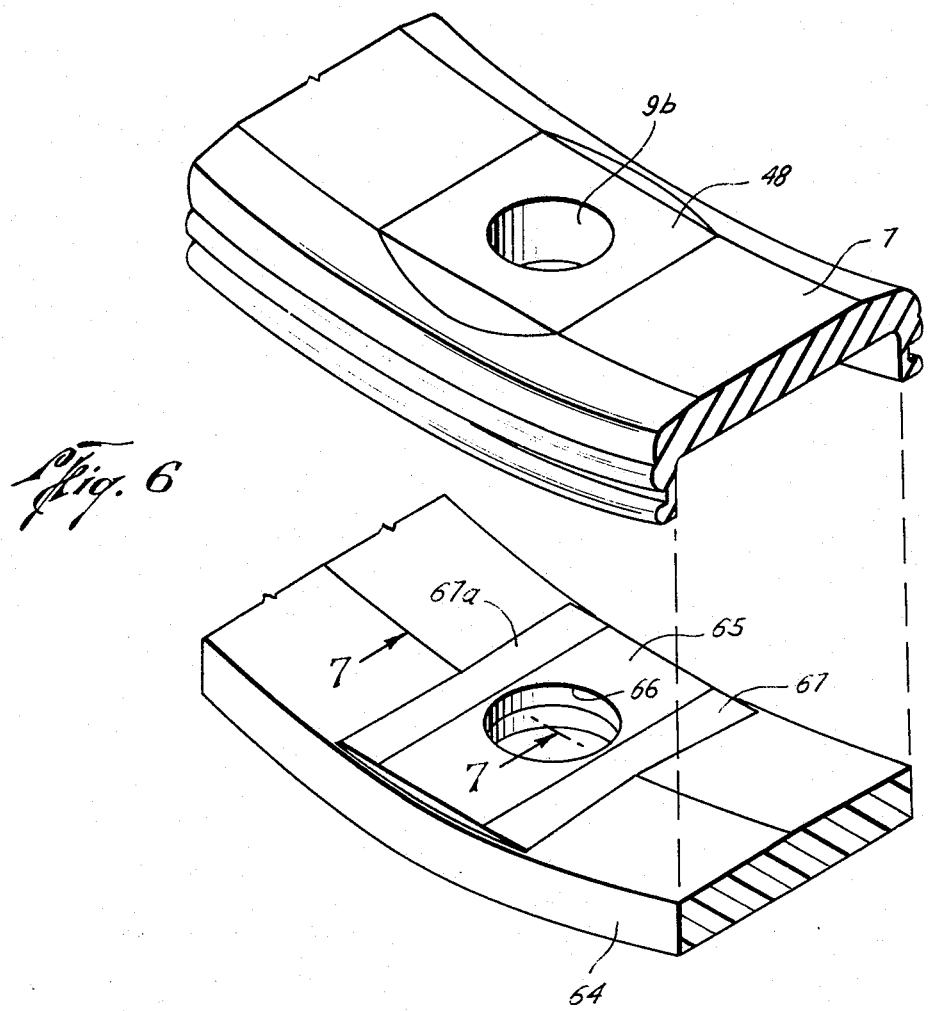
FIG. 6 is a view similar to FIG. 3, but showing the preferred form of the invention.
Figure 7:
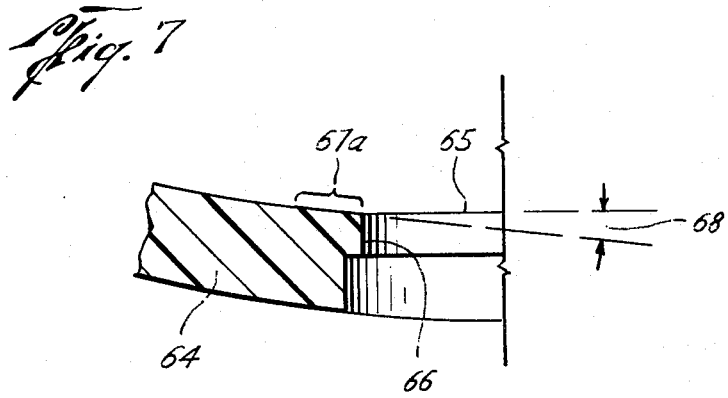
FIG. 7 is a partial section of the structure in FIG. 6 taken on line 7—7 thereof.

FIGS. 6 and 7 illustrate the preferred form of the invention in which the portions 65 of the inner surfaces of the back-up ring 64 abreast of and on opposite sides of the shaft opening 66 and, of course, the mating surface of the corresponding liner portions, are flat or planar and normal to the axis of the opening for the full width of the ring. Extensions 67, 67a at the sides of flat portions 65, slope circumferentially and form the radially dihedral angles 68 of about 6° to the mating surface parts 65, as illustrated in FIG. 7. Thus, the abutting portions of the liner and valve hubs are of increasing resistivity as the disc approaches its closed position, as in the previous forms. The extension surfaces 67, 67a as well as the entire inner surface of backing member 64, slope slightly from center section line 7—7, normal thereto, to permit draft of the backing part from the mold.

The invention may be modified in various respects as will occur to those skilled in the art, and the exclusive use of all modifications as come within the scope of the appended claims is contemplated.

I claim:

1. A butterfly valve having a body forming a flow passage with diametral shaft openings, a valve disc including aligned shafting portions journalled in said openings, resilient liner means interposed between said body and said disc including generally tubular bearing portions surrounding and sealing said shafting portions, each corresponding pair of said shafting and liner bearing portions having compressively and slidably abutting end thrust bearing surfaces surrounding and sealing said shafting portions, liner backup structure, said liner bearing portions and backup structure having complementary abutting surfaces inclined, at least in part, to a plane normal to the axis of said shafting portions so that said liner portions, at least in part, are of decreasing thickness and, therefore, increasing compressive resistivity as said valve disc approaches its closed position.

2. A butterfly valve as described in claim 1 in which said shafting includes hub portions abutting said liner portions and said abutting end thrust bearing surfaces of said liner and hub portions are parallel to a plane normal to the axis of said shafting.

3. A butterfly valve as described in claim 1 in which the peripheries of said outer end surfaces of said liner portions are tilted radially, at least in part, with respect to a plane normal to the axis of said shafting so that the greatest increase in compressive resistance occurs at said peripheries of said latter surfaces.

4. A butterfly valve as described in claim 1 in which each of said liner portions has a part abreast of said disc, in the closed position thereof, with an end surface inclined radially inwardly relative to said body passageway to produce increased compressive seating force at the periphery of said liner portion in the closed position of the valve disc.

5. A butterfly valve as described in claim 1 in which each of said liner portions has first parts at opposite sides of the corresponding shaft opening and lateral extensions of said parts, said first parts having flat end surfaces in a plane normal to the disc axis and said extensions having tilted planar surfaces forming dihedral angles with the meeting surfaces of said first parts.

6. A butterfly valve having a body forming a flow passage with diametral shaft openings, a valve disc including aligned shafting portions journalled in said openings, resilient liner means interposed between said body and said disc including backup structure and tubular journal bearing portions surrounding and sealing said shafting portions, each corresponding pair of said shafting and liner bearing portions having compressively and slidably abutting end thrust bearing surfaces surrounding and sealing said shafting portions and incorporating means providing increasing compressive resistivity between portions of said abutting end thrust bearing surfaces aligned with said disc, as said disc nears its closed position, to improve the sealing effect thereof.

* * * * *